United States Patent [19]
> Cimato

[11] Patent Number: 4,767,956
[45] Date of Patent: Aug. 30, 1988

[54] TRANSDUCER CLAMP

[75] Inventor: Thomas R. Cimato, Orchard Park, N.Y.

[73] Assignee: Moog Inc., East Aurora, N.Y.

[21] Appl. No.: 145,896

[22] Filed: Jan. 20, 1988

[51] Int. Cl.⁴ .......................... H02K 5/22; H02K 19/36
[52] U.S. Cl. ...................................... 310/91; 248/507; 310/89; 324/208
[58] Field of Search ............ 73/866.5; 248/310, 316.6, 248/500, 507; 310/89, 91, 241, 42; 318/661; 324/158, 208; 24/514, 569

[56] References Cited

U.S. PATENT DOCUMENTS

| 2,896,295 | 7/1959 | Fischer | 24/263 |
| 3,387,814 | 6/1968 | Fischer | 248/507 |
| 3,652,886 | 3/1972 | Riordan et al. | 310/89 |
| 4,399,384 | 8/1983 | Lucherini | 310/241 |
| 4,612,501 | 9/1986 | Costello et al. | 324/208 |

FOREIGN PATENT DOCUMENTS 2135653  1/1973  Fed. Rep. of Germany ........ 310/89

OTHER PUBLICATIONS

Fischer, "A Shopper's Guide to Synchro Clamps", Machine Design (Jan. 27, 1972), [pp. 104–107].

Primary Examiner—Patrick R. Salce
Assistant Examiner—D. L. Rebsch
Attorney, Agent, or Firm—Sommer & Sommer

[57] ABSTRACT

An improved clamping mechanism is used to mount a transducer (11) on a motor housing (12). The motor housing has an inclined surface (18). The clamp (13) has one portion (32) engaging the inclined housing surface, and has another portion (30) engaging the transducer. A fastener (33) is used to move the clamp relative to the motor housing. The radial force exerted by the clamp on the transducer is greater than the axial force exerted by the clamp on the transducer.

12 Claims, 1 Drawing Sheet

TRANSDUCER CLAMP

TECHNICAL FIELD

This invention relates generally to the field of motors (e.g., fluid-powered, electromagnetic, etc.), and, more particularly, to an improved clamp for securely restraining a transducer (e.g., a resolver, an encoder, a synchro, etc.) or some other component against both axial and rotative movement relative to the motor housing.

BACKGROUND ART

Motors exist in the prior art in a variety of forms. Some are operated by fluid power (i.e., those of the expansible chamber type), while others are operated electromagnetically. In many of these, one part (i.e., the rotor) rotates relative to a stationary part (i.e., the stator). Often, the rotor is associated with a shaft.

When such motors are incorporated into larger systems, it may be desired to monitor the angular position of the rotor relative to the stator. For example, in a stepping motor servosystem, the desired angular position of the rotor relative to the stator may be provided as an electrical command. The actual relative position between the rotor and stator may be determined by a transducer, such as a resolver or the like, and the output thereof provided as a negative feedback signal. The command and feedback signals are algebraically summed so as to drive the error therebetween toward zero.

A revolver itself typically has a shaft rotatably mounted on a body. The resolver body is typically mounted on the motor housing, such that the resolver shaft is coaxial with, and coupled to, the motor shaft. In mounting such a device on a motor housing, the body must initially be angularly adjustable relative to the motor housing in order to allow nulling of the transducer. Once the initial relative angular position between the transducer body and motor housing has established, the transducer body must be thereafter restrained against unintended axial and rotative movement relative to the motor housing. At the same time, the mounting mechanism should be adjustable to allow for subsequent adjustment and modification of such relative angular positions.

Such position transducers are commonly available off-the-shelf in a form which an angular groove extends radially into the transducer body from a cylindrical outer surface, adjacent one end face. Another standard style has one or more annular flanges extending radially outwardly from the cylindrical side wall. In either case, such configuration provides a groove, either raised or recessed, on the body. This groove is, on information and belief, deliberately provided to receive and accommodate a plurality of "synchro clamps", by which the transducer may be mounted on the housing. Thus, such clamps have typically been provided so as to engage both the transducer body and the housing to adjustively mount the transducer body thereto. Various types and configurations of such clamps are arrayed and described in Fischer, "A Shopper's Guide to Synchro Clamps", Machine Design (Jan. 27, 1972)(at pp. 104-107), and in U.S. Pat. No. 2,896,295.

These synchro clamps are intended to provide a low-cost means for mounting the transducer on the motor housing. However, it is Applicant's belief that such clamps as have been developed heretofore have inadequately restrained the transducer body against rotation relative to the motor housing. In fact, it has been Applicant's experience that with such prior art synchro clamps, the transducer body may actually rotate unintentionally during use relative to the housing by extemely small increments. However, depending upon the end use to which the motor is put, even such small incremental angular displacements may aggregate over a long duty cycle (e.g., 50,000 cycles). Hence, the individual error may aggregate and accumulate to provide a significant relative angular position error, with the concomitant effect that null shift in the transducer output signal occurs.

Upon information and belief, many of these prior art synchro clamps were designed and intended to exert principally an axial force on the resolver body. Some clamps were designed to provide both axial and radial forces on the transducer body. However, this was done at the expense of actually bending the shank of a screw, which was used to tighten the clamp against the body and housing. (See, e.g., FIG. 2 of said Machine Design article, at p. 107, and accompanying text at p. 106). Indeed, in this arrangement, the clamp geometry was such that only a fraction of the force exerted by the screw on the clamp was transmitted to the transducer body. Moreover, because this implementation acutally contemplated that the shank be bent as the screw was tightened, the operator was hesitant to adequately tighten the screw for fear of breaking it. Moreover, it is now believed that the inability of such prior art synchro clamps to exert an adequate radial force on the transducer body, was responsible for permitting such undesired relative angular movement between the clamped body and housing.

An improved transducer clamp should have the following characteristics or properties: (1) the mounting screw should not be bent, in order that it may be tightened as much as possible, (2) the clamp should offer the capability of holding the transducer body at any selected angular position relative to the housing, both initially and after some use, (3) the clamp should be usable with standard off-the-shelf transducer configurations, (4) the clamp should exert a significant radial load on the transducer body to prevent unintended relative angular rotation during use, (5) the clamp should not impart rotation to the transducer while tightening the fastener, and (6) such a clamp should be economical to both make and use.

DISCLOSURE OF THE INVENTION

The present invention provides an improved clamp for operatively mounting a transducer or some other component on a motor housing. The housing may have an abutment surface against which an end face of the transducer bears. The housing also has an inwardly-facing surface surrounding a portion of the transducer body. The transducer body has an outwardly-facing surface arranged in spaced facing relation to this housing surface. This body surface is commonly provided in an annular recess, but this need not be so. The improvement broadly comprises: a clamp operatively positioned between the body and the housing, the clamp having one portion engaging the housing surface and having another portion engaging the body surface. One of the housing and body surfaces is inclined with respect to the other of such surfaces in one axial direction such that when the clamp is moved in such one axial direction relative to both the body and the housing, the radial force exerted by the clamp on the body will be greater than the axial force exerted by the clamp on the body; and displacement means, such as a conventional threaded fastener, for selectively moving the clamp in such one axial direction relative to the body and housing; whereby the body may be effectively clamped against unintended axial and rotative movement relative to the housing.

Accordingly, the general object of the invention is to provide an improved clamp for operatively mounting a transducer or component on a motor housing.

Another object is to provide an improved clamp which allows the angular position of the transducer body to be adjusted, both initially and after use.

Another object is to provide an improved synchro clamp for mounting a transducer on a motor housing, which clamp effectively prevents relative angular movement of the transducer body relative to the motor housing during and after tightening of the clamping screw, even if the apparatus experiences substantial vibration (both as to amplitude and/or frequency) during use.

Another object is to provide an improved synchro clamp which exerts a substantial radial force on a transducer body, without bending a screw or fastener by which the clamp is drawn toward the motor housing.

Still another object is to provide an improved synchro clamp in which the radial force exerted by the clamp on the transducer body is deliberately greater than the axial force exerted by the clamp on the body.

These and other objects and advantages will become apparent from the foregoing and ongoing written specification, the drawings, and the appended claims.

MODE(S) OF CARRYING OUT THE INVENTION

Figure 1:
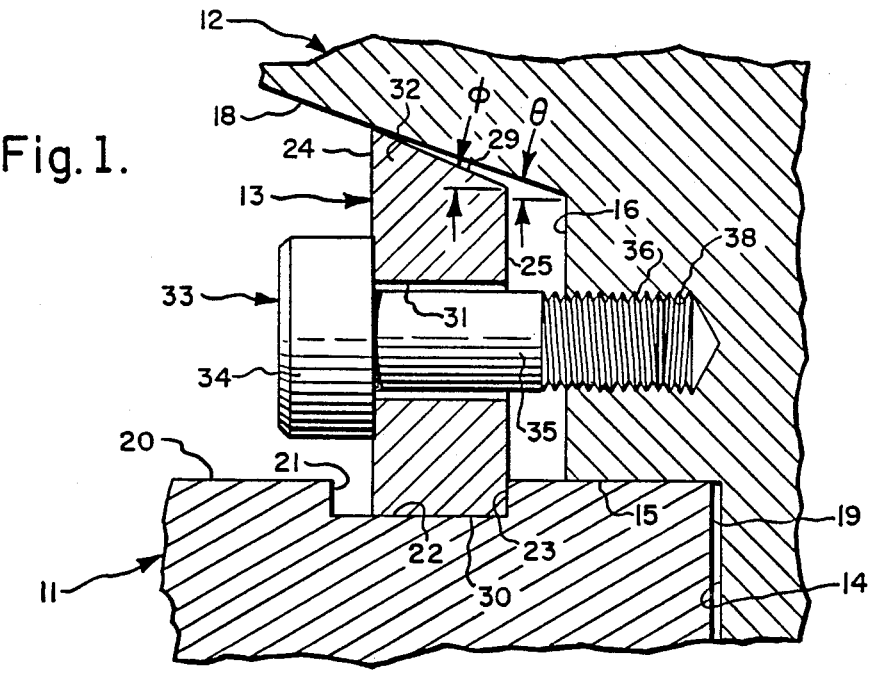
FIG. 1 is a fragmentary longitudinal vertical sectional view of one improved mounting clamp, this view showing such clamp as operatively holding a portion of a transducer body on a motor housing.

At the outset, it should be clearly understood that like reference numerals are intended to identifying the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are intended to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, a fragmentary portion of a transducer or component body 11 is shown as being operatively mounted on a fragmentary portion of a motor housing 12 by means of the improved clamps, one of which is indicated at 13. Persons skilled in this art will readily appreciate that a plurality of such clamps, typically arranged in a bolt circle, would be spaced about the transducer body, and engaged with the motor housing. However, in the interest of clarity, only one such clamp is depicted as operatively holding proximate portions of the transducer body and motor housing.

In FIG. 1, the transducer is to be mounted on the body along a horizontal axis (not shown) running from left-to-right. The motor housing is depicted as having with respect to such axis: a leftwardly-facing annular vertical surface 14, an inwardly-facing horizontal cylindrical surface 15 extending leftwardly therefrom, another leftwardly-facing annular vertical surface 16 extending radially outwardly therefrom, and a leftwardly- and inwardly-facing frusto-conical surface 18 extending leftwardly and radially outwardly therefrom.

The transducer body is a horizontally-elongated member, and is shown in pertinent part as having an annular vertical right end face 19 arranged to face housing abutment surface 14. In FIG. 1, these two surfaces are shown as being physically separated so that the transducer may have a component of axial movement when the fastener is tightened. An outwardly-facing horizontal cylindrical surface 20 extends leftwardly from the outer margin of transducer right end face 19. Thus, housing surfaces 14,15 define a socket-like recess in which the right marginal end portion of the transducer body is received. This particular transducer is an off-the-shelf or standard item, and is provided with an annular groove or recess which extends radially into the transducer body from its cylindrical surface 20 adjacent right end face 19. Specifically, this groove or recess is shown as including a rightwardly-facing annular vertical surface 21, an outwardly-facing coaxial horizontal cylindrical surface 22, and a leftwardly-facing annular vertical surface 23. However, in other standard transducers, a functionally-equivalent implementation of this groove or recess may be provided by one or more axially-spaced annular flanges extending radially outwardly from cylindrical side wall 20.

Figure 2:
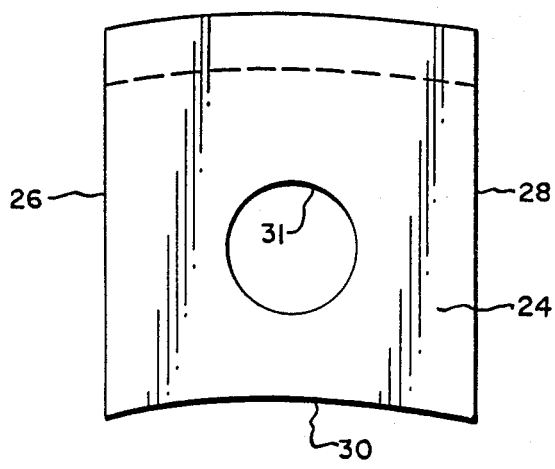
FIG. 2 is a front elevational view of the clamp shown in FIG. 1.
Figure 3:
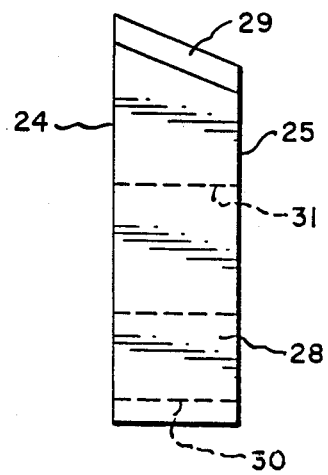
FIG. 3 is a right side elevational view of the clamp shown in FIG. 2.

Referring now to FIGS. 1–3, clamp 13 is shown as being a specially-configured member having planar vertical front and rear faces 24,25, and planar vertical left and right side surfaces 26,28, respectively. The upper-surface 29 is shown as being a segment of an outwardly- and rightwardly-facing frusto-conical surface which extends between clamp faces 24,25 and side surfaces 26,28. This surface is inclined at an acute included angle $\phi$ of less than 45°, and preferably in the range of about 10°–25°. In the illustrated embodiment, angle $\phi$ is about 22°, and housing frusto-conical surface $\theta$ is inclined at an acute angle of about 20°, these angles being somewhat exaggerated for clarity. The lower surface 30 of the clamp is shown as being cylindrical, and as having a radius of curvature substantially equal to the radius of recess surface 22. Thus, the lower surface of the clamp fits the recess surface like a saddle. The clamp is further provided with a horizontal through-hole 31, which extends between clamp faces 24,25. The centerline of hole 31 is about half-say between upper and lower surfaces 29,30. Angle $\phi$ is different from angle $\theta$ so that the upper trailing edge 32 (i.e., defined by the intersection of front face 24 and upper surface 29) will engage housing inclined surface 18 substantially in line contact. Since this is the trailing edge of the clamp, it will not dig into surface 18 when the clamp is moved rightwardly (i.e., in the axial direction) relative to the motor housing. As previously noted, the clamp lower surface 30 is fitted to the contour of the transducer. Hence, when fastener 33 is tightened so as to move the clamp rightwardly relative to the housing, the clamp will be restrained against rotation about the axis of the fastener relative to the transducer and housing.

Fastener 33 is a species of displacement means for selectively moving the clamp rightwardly relative to the body. This fastener has a head portion 34 arranged to engage clamp front face 24, has a shank portion 35 passed through clamp hole 31, and has a threaded marginal end portion 36 matingly received in a horizontal tapped blind hole 38 provided in the housing.

Thus, the apparatus is initially assembled as shown, with clamp edge 32 engaging housing inclined surface 18, and with clamp lower surface 30 engaging transducer surface 22. In the form shown, a lower marginal end portion of clamp right face 25 engages recess surface 23. In other configurations, however, this particular arrangement need not necessarily obtain. Hence, when fastener 33 is tightened, the clamp will be drawn rightwardly relative to the housing. However, as the clamp moves rightwardly relative to the housing, the engagement of clamp upper edge 32 with housing inclined surface 18 will cause the clamp to exert a radial inward force on the body. Radial movement of the clamp relative to the fastener is accomodated by the radial clearance between fastener shank portion 35 and clamp hole 31. Since angle $\theta$ is less than 45°, the radial force exerted by the clamp on the body will be greater than the axial force exerted by the clamp on the body. In other words, while the extent of axial clamp displacement will be greater than the extent of radial clamp displacement, the mechanical advantage afforded by the angle of inclination of body surface 18 ensures that the radial force exerted on the clamp will be greater than the axial force exerted on the clamp.

Thus, the improved clamp offers all of the advantages sought. First, the fastener itself is not subjected to bending or flexural loads. Hence, it may be tightened to its design limit without fear of a premature failure due to bending. Secondly, the arrangement allows the angular position of the transducer body relative to the motor housing to be varied, as during nulling. This may be done initially when the transducer or component is first mounted on the motor housing, or subsequently after use. Thus, the transducer body is initially and thereafter angularly adjustable relative to the motor housing. Thirdly, the clamp is adapted for use with standard off-the-shelf transducer and component configurations. As previously noted, some of these standard components are provided with an annular recess of the type shown, while others are provided with an outwardly-extending flange. Fourth, the improved clamp exerts a large radial load on the transducer to prevent rotation of the transducer relative to the housing during use. In fact, the improved clamp has been deliberately designed so that the radial force exerted on the body by the clamp is greater than the axial force exerted thereon. This feature alone immediately distinguishes the improved clamp from prior art synchro-clamps. Moreover, the improved clamp allows a rotatable fastener to tighten the clamp while the clamp does not impart a rotational torque to the transducer body. Finally, the improved clamp is economical to manufacture and use. If desired, the clamp may be either machined or conveniently formed by a powdered metallurgy technique.

MODIFICATIONS

The present invention expressly contemplates that many changes and modifications may be made. For example, housing surface 18 could be cylindrical and coaxial with respect to the alignment of the transducer, and the body could be provided with an inclined or frusto-conical surface, as appropriate. The portion (i.e., edge 32) of the clamp which engages the housing surface is not limited to line contact, and encompasses area contact as well. Indeed, the invention contemplates that as the fastener is tightened, the extent of contact between the clamp upper portion and housing surface 18 will increase due to cold working of the mating surfaces. Angles $\phi$ and $\theta$ may be varied, as desired. As expressly mentioned, the transducer may be provided with a groove, recess or slot, which may or may be of an annular nature, or may be provided with one or more outwardly-extending raised radial lugs. The displacement means is not limited to a bolt-like fastener of the type shown, or even to a threaded fastener. The overall function of the displacement means is simply to forceably move the clamp in an axial direction relative to the housing. The complementary shape of surfaces 22,30 may also be varied. the transducer may be a revolver, an encoder, a synchro, a precision potentiometer, or some other electrical or mechanical component.

Therefore, while a preferred embodiment of the improved clamp has been shown and described, and several modifications thereof discussed, persons skilled in this art will readily appreciate that various additional changes and modifications may be made without departing form the spirit of the invention, as defined and differentiated by the following claims.

I claim:

1. In a motor having a housing to which a transducer body is to be mounted along an axis, said housing having an inwardly-facing surface surrounding a portion of said body, said body having an outwardly-facing surface arranged in spaced facing relation to said housing surface, the improvement which comprises:
    a clamp operatively positioned between said body and housing, said clamp having one portion engaging said housing surface and having another portion engaging said body surface, one of said housing and body surfaces being inclined with respect to the other of said housing and body surfaces in one axial direction such that when said clamp is moved in said one axial direction relative to said housing the radial force exerted by said clamp on said body will be greater than the axial force exerted by said clamp on said body; and
    displacement means for selectively moving said clamp in said one axial direction relative to said body and housing;
    whereby said body may be effectively clamped against axial and rotative movement relative to said housing.

2. The improvement as set forth in claim 1 wherein said one of said housing and body surfaces is cylindrical, and the other of said housing and body surfaces is frusto-conical.

3. The improvement as set forth in claim 1 wherein said housing surface is inclined relative to said body surface.

4. The improvement as set forth in claim 3 wherein said housing surface is frusto-conical and said body surface is cylindrical.

5. The improvement as set forth in claim 1 wherein said clamp one portion is an edge of said clamp.

6. The improvement as set forth in claim 1 wherein said clamp other portion is an edge of said clamp.

7. The improvement as set forth in claim 1 wherein the angle of inclination is from about 10–25 degrees.

8. The improvement as set forth in claim 1 wherein said transducer is a resolver.

9. The improvement as set forth in claim 1 wherein said body has and end face and wherein said housing has a bearing surface arranged to engage said body end face.

10. The improvement as set forth in claim 1 wherein said body surface is provided in a recess which extends into said body.

11. The improvement as set forth in claim 1 wherein said displacement means includes a threaded fastener arranged to act between said housing and clamp.

12. The improvement as set forth in claim 11 wherein said fastener acts on said clamp at a location intermediate said end portions.

* * * * *